United States Patent [19]

Wentzell

[11] Patent Number: 4,581,938
[45] Date of Patent: Apr. 15, 1986

[54] TOOL FOR SCANNING THE INNER SURFACE OF A LARGE PIPE

[75] Inventor: Timothy H. Wentzell, South Windsor, Conn.

[73] Assignee: Combustion Engineering, Inc., Windsor, Conn.

[21] Appl. No.: 635,853

[22] Filed: Jul. 30, 1984

[51] Int. Cl.[4] ............................................ G01N 29/04
[52] U.S. Cl. ........................................ 73/623; 73/634; 73/638; 73/640
[58] Field of Search ................. 73/622, 623, 633, 634, 73/638, 640; 324/220

[56] References Cited

U.S. PATENT DOCUMENTS

| | | | |
|---|---|---|---|
| 3,862,578 | 1/1975 | Schluter | 73/623 |
| 4,218,923 | 8/1980 | Triplett et al. | 73/623 |
| 4,432,271 | 2/1984 | Wentzell et al. | 73/633 |
| 4,460,920 | 7/1984 | Weber et al. | |

Primary Examiner—Howard A. Birmiel
Attorney, Agent, or Firm—L. James Ristas

[57] ABSTRACT

A tool (100) for scanning the inner surface (110) of a pipe (106), comprising a scanning section (112) interacting with a centering section (114). The scanning section includes an axle member (128) having strut members (130) rigidly connected thereto and projecting diametrically outwardly for urging inspection probe sleds (126) against the pipe surface. The centering section (114) includes a slide cylinder (124) coaxially disposed about the axle member (128), and having rigidly connected actuating members (120) projecting diametrically outward for contacting the pipe inner wall with sufficient force to center and support the tool within the pipe. Locking means (146) are provided within the actuating member (120) for selectively engaging the axle member (128) to lock the longitudinal position of the strut member (130) relative to the actuating member (120). A positioning device (102) is connected to the axle member (128) whereby in a first mode of operation the scanning section (112) can be rotated or moved longitudinally relative to the supporting base provided by the centering section (114). In a second mode of operation, the actuating members (120) are disengaged from the pipe surface (110) and the axle member (128) is locked to the slide cylinder (124) by means of a piston (140), and locking rod (142,146). In the lock mode, the tool (100) can be relocated within the pipe (106). The tool provides centering and support even in pipe elbows, such that the probe sleds can traverse and closely follow the entire contoured pipe surface (110).

4 Claims, 2 Drawing Figures

TOOL FOR SCANNING THE INNER SURFACE OF A LARGE PIPE

BACKGROUND OF THE INVENTION

This invention relates to remotely controlled tools for use in relatively inaccessible areas, and more particularly to a tool for internally inspecting elbows in large pipes.

In many industries, the need arises for inspecting the integrity or surface properties of large pieces of equipment that may operate under pressure or otherwise have potentially severe economic or safety consequences in the event of rupture or failure. In the nuclear power industry, the reactor vessel and associated nozzles and piping must be periodically inspected. One area that has been particularly difficult to inspect is the elbow area in piping connected to reactor vessel. Ultrasonic inspection of the pipe is desired to assure that no cracks or other weaknesses will render the pipe susceptible to failure.

SUMMARY OF THE INVENTION

The apparatus of the present invention solves this problem, in the form of a unique tool having two major sections, a scanning section and a centering section. In use, the inspection tool is preferably mounted on a conventional positioning device that is aligned with the reactor vessel nozzle from within the vessel. The scanning section of the tool carries sleds for supporting conventional ultrasonic probes, and the centering section provides a means for centering the tool within the pipe and supporting it during longitudinal and rotational motion of the scanning section.

In more specific terms, the scanning section includes an axle member to which are rigidly connected preferably two sets of diametrically extending strut members. The strut members include outer portions which carry the sleds and have means for urging the sleds outwardly toward the internal surface of the pipe. The centering section includes a slide cylinder or sleeve coaxially disposed about the axle member and having preferably two sets of actuating members rigidly connected thereto and projecting diametrically outward. The actuating members include means for extending the outer portion of the member into contact with the pipe wall under sufficient pressure to secure the tool within the pipe. Locking means are operatively connected to the actuating member for selectively engaging the axle to lock the longitudinal position of the strut member relative to the actuating member.

When connected to the conventional remote positioner, the tool operates in essentially two modes. Once the tool has been initially positioned within the nozzle or pipe, the first mode begins when the actuating members are extended to bear upon the pipe internal surface to center and secure the tool. The axle member is free to rotate within the sleeve thereby enabling the sleds carried thereon to make a complete revolution around the inner surface of the pipe. With the centering section in place, the positioner may advance the scanning section longitundinally relative to the centering section and then rotate the scanning section to test another circumferential strip on the pipe inner surface.

After several such rotations, the entire tool must be advanced within the pipe, in accordance with the second mode of operation. The outward bias on the struts is relaxed and the actuating member is retracted. While retracting, the actuating member locks the axle member with respect to the sliding sleeve. When the positioner pushes on the tool, the entire tool moves further into the pipe. The locking action maintains the spatial relationship between the scanning section and the centering section.

To begin another inspection cycle, the centering section is secured to the inner surface of the pipe and the scanning section is extended to urge the inspection sleds against the pipe wall.

The present invention provides a tool for inspecting the curved, or elbow portion of a large pipe by uniquely coordinating of the centering and supporting function, with the inspection probe translation function. The inspection struts can be rotated to enable gimballed sleds to maintain perpendicularity with respect to their respective traversed surfaces, while the centering section provides a firm, centered base. Several scan rotations can be taken from a given base position, since the scanning and centering sections are independent during the inspection mode. The precise location of the sleds can be controlled and recorded based only on the known coordinates of the positioner, without significant uncertainties added by the inspection tool itself.

BRIEF DESCRIPTION OF THE DRAWINGS

Additional features, benefits and advantages of the invention will be evident to those skilled in this art, from the description of the preferred embodiment set forth below and the references to the accompanying figures, in which.

DESCRIPTION OF THE PREFERRED EMBODIMENT

Figure 1:
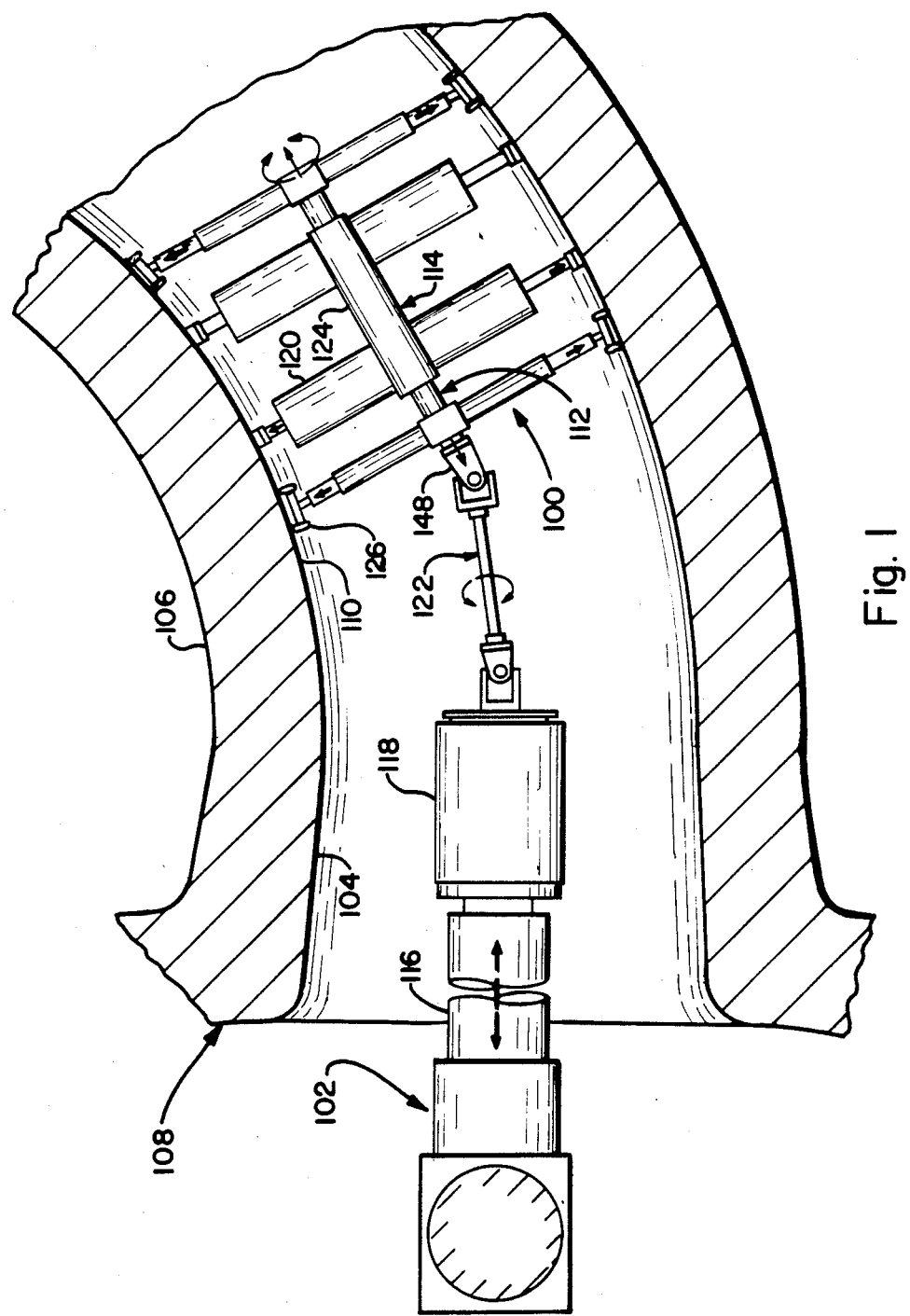
FIG. 1 is a partially sectioned view of a nuclear reactor vessel nozzle and pipe elbow in which are located a conventional remote positioner device to which is attached the inventive inspection tool.

FIG. 1 shows the inventive inspection tool 100 connected to a conventional remote positioner 102, as would be employed for making an ultrasonic inspection of the inner surface of the nozzle 104 and pipe 106 associated with a nuclear reactor vessel 108. The positioner 102 is typically centered on the vertical axis of the vessel 108 and is extended tranversely from the vessel axis along the centerline of the nozzle inner wall 104. The invention will be described with respect to an intermediate position along the pipe 106, where a turn, or elbow 110 in the pipe prevents acceptable operation of conventional inspection tooling.

The basic operation of the tool 100 involves a scanning section 112 interacting with a centering section 114. The centering section 114 centers and supports the inspection tool 100, while the extension mechanism 116 and rotator mechanism 118 on the remote positioner 102 control the scanning section 112. Energizing the actuator or centering cylinders 120 secures the tool against the inner surface of the pipe 106. Either longitudinal or rotational motion may be imparted to the scanning section 112, even at the pipe elbow 110 through the flexibility provided by the dual universal joint 122. The scanning section 112 carries pivoted or gimballed sleds 126 which follow the pipe contour.

Figure 2:
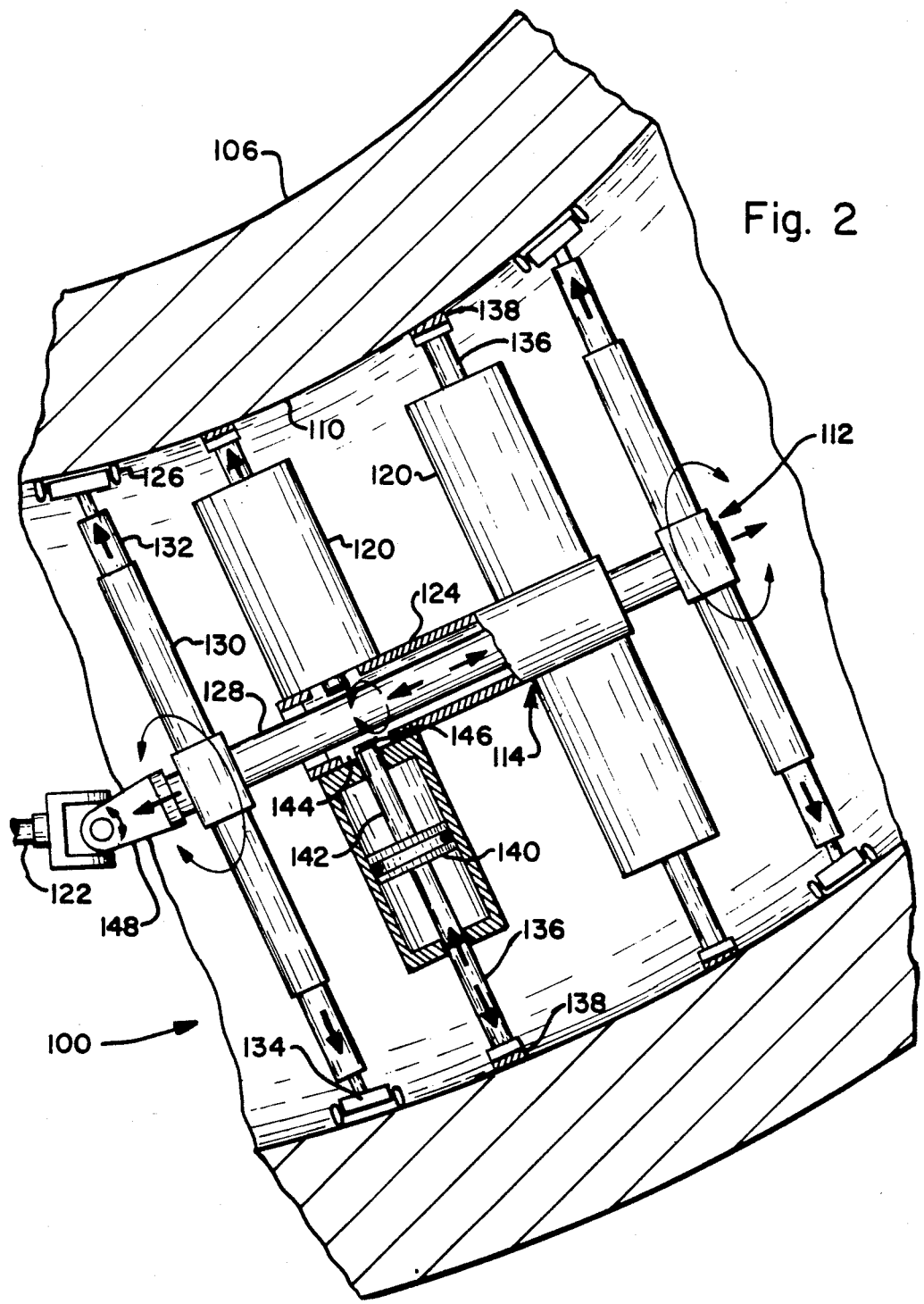
FIG. 2 is an enlarged, partially sectioned view of the inspection tool, showing in partial cut-away, the relationship between the scanning section axle member and the centering section sleeve cylinder.

FIG. 2 is an enlarged view of the inspection tool 100 shown in FIG. 1, with a partially cut-away view of the central portion of the tool to illustrate the relationship between the scanning section 112 and the centering section 114. The centering section 114 includes a slide cylinder 124 preferably in the form a journal bearing tube oriented generally coaxially with the center line of the pipe 106. The actuating cylinders 120 are rigidly connected to the slide cylinder and extend diametrically toward the pipe inner surface. Preferably, two sets of such actuating cylinders 120 are adjacently connected on a single slide cylinder 124.

The scanning section 112 includes a hub or axle member 128 coaxially disposed within the slide cylinder 124 and adapted to rotate and slide therewithin. A set of strut members 130 extend diametrically from the axle member 128, at preferably both ends thereof, outside the actuating cylinders 120. Inspection probe sleds 126 are located on outer strut segments 132 which are preferably outwardly biased by controlled air pressure through the axle member 128 and strut 130. The sleds 126 are preferably gimballed 134 to allo the sleds to maintain perpendicularity with respect to the pipe inner wall 110. Although the illustrated embodiment is directed to an ultrasonic inspection tool, it should be appreciated that other types of probes, transducers or devices could be carried by the sleds without departing from the scope of the invention.

Each actuating cylinder 120 preferably includes an outer actuator portion 136 having support pads 138 thereon for engaging the pipe walls to prevent sliding. The outer actuator portion 136 is preferably controlled by a piston 140 to which is also connected an inner rod 142 that passes through an opening 144 in the slide cylinder or sleeve 124. Locking pads 146 are adapted to engage the axle member 128 when the piston 140 moves towards the sleeve 124, thereby retracting the outer portion 136 while locking the scanning section 112 to the centering section 114. This locks the longitudinal position of the strut member 130 relative to the actuating member 120 and enables the extension mechanism 116 on the remote positioner (FIG. 1) to push the entire inspection tool 100 to a new basic location deeper into the pipe 106.

Once the tool is relocated to the new basic position, the pistons 140 are actuated outwardly to disengage the locking pads 146 and to engage the support pads 138. The sleds 126 are urged outwardly into contact with the pipe wall 110, and the scanning section 112 may be rotated or moved longitudinally a short distance along the pipe relative to the fixed position of the centering section 114. Preferably, several rotations are made by the scanning section 112 for a given fixed position of the centering section 114 so that the time required to complete a pipe inspection is minimized. After several rotations the strut member 130 will nearly abut the actuating cylinder 120 and a move of the entire tool 100 to a new position would be required. Since the axle 128 is locked to the slide cylinder 124 during relocation of the tool, the relative longitudinal spacing between the scanning section 112 and centering section 114 is not altered. Thus, only the movement of the extension mechanism 116 and rotator 118 need be monitored to accurately establish the position of the sleds 126 within the pipe 110.

In the illustrated embodiment, a mounting boss 148 is located on the end of the axle member closest to the positioner 102, for connecting the tool 100 to the means for imparting longitudinal and rotational movement to the axle member 128, or scanning section 112. Thus, the scanning section may be considered the primary component that is connected to and controlled by the positioner 102. The centering section 114 is relatively slidable and selectively lockable thereto, for providing centering and support during the movement of the scanning section associated with the surface inspection operation.

I claim:

1. A tool for scanning the inner surface of a pipe, comprising:

an axle member (128) having at least one strut member (130) rigidly connected thereto and projecting diametrically outward therefrom, the strut member including an extendable outer portion (132) for urging sled means (126) against said surface;

a slide cylinder (124) coaxially disposed about said axle member (128) and having at least one actuating member (120) rigidly connected thereto and projecting diametrically outward therefrom, the actuating member including an outer portion (136) extendable with sufficient force to contact said surface and center and support the tool within the pipe;

locking means (146) operatively connected to said actuating member (120) for selectively engaging the axle member (128) to lock the longitudinal position of the strut member (130) relative to the actuating member (120);

mounting means (148) located on one end of the axle member for engaging a positioner device (102) capable of imparting longitudinal and rotational motion to said axle member (128);

whereby in a first mode of operation the actuating member (120) can be extended to bear upon said surface and said strut members can be rotated or advanced longitudinally within the pipe by said positioner means (102), and in a second mode the slide cylinder (124) can be locked to said axle (128), the strut members (130) relaxed, and the actuator member (120) retracted such that the entire tool (100) may be moved longitudinally within the pipe 2. The tool recited in claim 1 wherein, the slide cylinder (124) is in the form of a journal bearing tube having openings (144) and the actuating members (120) and said locking means (146) pass through said openings from the actuating member (120) to said axle member (128).

3. The tool recited in claim 2 wherein, said actuating member (120) includes a piston member (140) having an inner rod (142) adapted to pass through said opening (140) in the slide cylinder (124) and support said locking means (146).

4. The tool recited in claim 1 wherein said sled means (126) are gimballed (134) to remain perpendicularly oriented to the pipe wall as the strut members are rotated by the positioner.

* * * * *